(12) United States Patent
Wang et al.

(10) Patent No.: US 11,973,250 B2
(45) Date of Patent: Apr. 30, 2024

(54) ANTIOXIDANT FOR FUEL CELLS TO IMPROVE DURABILITY

(71) Applicant: Toyota Motor Engineering & Manufacturing North America, Inc., Plano, TX (US)

(72) Inventors: Liang Wang, Saline, MI (US); Hongfei Jia, Ann Arbor, MI (US); Naoki Nakamura, Nagaizumi-cho (JP)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 439 days.

(21) Appl. No.: 17/407,610

(22) Filed: Aug. 20, 2021

(65) Prior Publication Data

US 2023/0056498 A1   Feb. 23, 2023

(51) Int. Cl.
| | |
|---|---|
| *H01M 8/1004* | (2016.01) |
| *H01M 4/86* | (2006.01) |
| *H01M 4/88* | (2006.01) |
| *H01M 4/90* | (2006.01) |
| *H01M 4/92* | (2006.01) |
| *H01M 50/497* | (2021.01) |

(52) U.S. Cl.
CPC ....... *H01M 8/1004* (2013.01); *H01M 4/8605* (2013.01); *H01M 4/8657* (2013.01); *H01M 4/8807* (2013.01); *H01M 4/9033* (2013.01); *H01M 4/921* (2013.01); *H01M 50/497* (2021.01)

(58) Field of Classification Search
None
See application file for complete search history.

(56) References Cited

U.S. PATENT DOCUMENTS

| | | |
|---|---|---|
| 2020/0020967 A1 | 1/2020 | Ko et al. |
| 2020/0287230 A1 | 9/2020 | Lee et al. |
| 2020/0313213 A1 | 10/2020 | Park et al. |

FOREIGN PATENT DOCUMENTS

KR    20190080052 A  *  7/2019

OTHER PUBLICATIONS

KR20190080052 English translation (Year: 2019).*
Stewart et al., Ceria and Doped Ceria Nanoparticle Additives for Polymer Fuel Cell Lifetime Improvement, ECS Transactions, 64 (3) 403-411 (2014) (Year: 2014).*

* cited by examiner

*Primary Examiner* — Lucas J. O'Donnell
(74) *Attorney, Agent, or Firm* — Jordan IP Law, LLC

(57) ABSTRACT

Disclosed herein are membrane-electrode assemblies and fuel cells comprising an anode comprising a first catalyst; a cathode comprising a second catalyst; and a proton exchange membrane between the anode and cathode; wherein at least one of the proton exchange membrane, anode, and cathode comprise an antioxidant comprising yttrium doped cerium oxide and a metal doped cerium oxide that has a faster release time of cerium ions compared to yttrium doped cerium oxide.

20 Claims, 5 Drawing Sheets

ANTIOXIDANT FOR FUEL CELLS TO IMPROVE DURABILITY

FIELD

The disclosure relates to fuel cells and, more particularly, to use of antioxidants to improve durability of fuel cells.

BACKGROUND

The background description provided herein is for the purpose of generally presenting the context of the disclosure.

Fuel cell vehicles represent a promising option for future mobility because they afford high energy efficiency and include a zero-emission powertrain platform. Current commercially available fuel cell vehicles use polymer electrolyte membrane fuel cells (PEMFCs). While the PEMFC technology has been commercialized for decades, it still faces major challenges of high material costs and a substantial performance gap.

One issue with the use of PEMFCs is the need for a longer operational lifetime of the fuel cell in a vehicle. Current fuel cells typically can provide an operational lifetime of 5,000 hours. A significantly longer lifetime, however, would be beneficial to passenger vehicles and is needed for practical use of fuel cells in commercial vehicles and heavy-duty trucks. Heavy-duty trucks, for example, require 25,000 hours operational lifetime and passenger vehicles would benefit from at least 8,000 hours operational lifetime. Therefore, it would be desirable to develop improved PEMFCs that have a longer lifecycle.

SUMMARY

This section provides a general summary of the disclosure, and is not a comprehensive disclosure of its full scope or all of its features.

In various aspects, the present teachings provide membrane-electrode assemblies comprising an anode comprising a first catalyst; a cathode comprising a second catalyst; and a proton exchange membrane between the anode and cathode; wherein at least one of the proton exchange membrane, anode, and cathode comprise an antioxidant comprising yttrium doped cerium oxide and a metal doped cerium oxide that has a faster release time of cerium ions compared to yttrium doped cerium oxide.

In other aspects, the present teachings provide fuel cells comprising: a membrane-electrode assembly comprising a proton exchange membrane, an anode comprising a first catalyst, and a cathode comprising a second catalyst, the proton exchange membrane positioned between the anode and cathode; a first microporous layer contacting the anode; a second microporous layer contacting the cathode; an anode diffusion layer contacting the first microporous layer; a cathode diffusion layer contacting the second microporous layer; a first flow channel contacting the anode diffusion layer; a second flow channel connecting the cathode diffusion layer; wherein at least one of the proton exchange membrane, anode, cathode, first microporous layer and second microporous layer comprise an antioxidant comprising yttrium doped cerium oxide and a metal doped cerium oxide that has a faster release time of cerium ions compared to yttrium doped cerium oxide.

In yet other aspects, the present teachings provide vehicles comprising one or more membrane-electrode assemblies or fuel cells described herein.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DESCRIPTION

Figure 1:
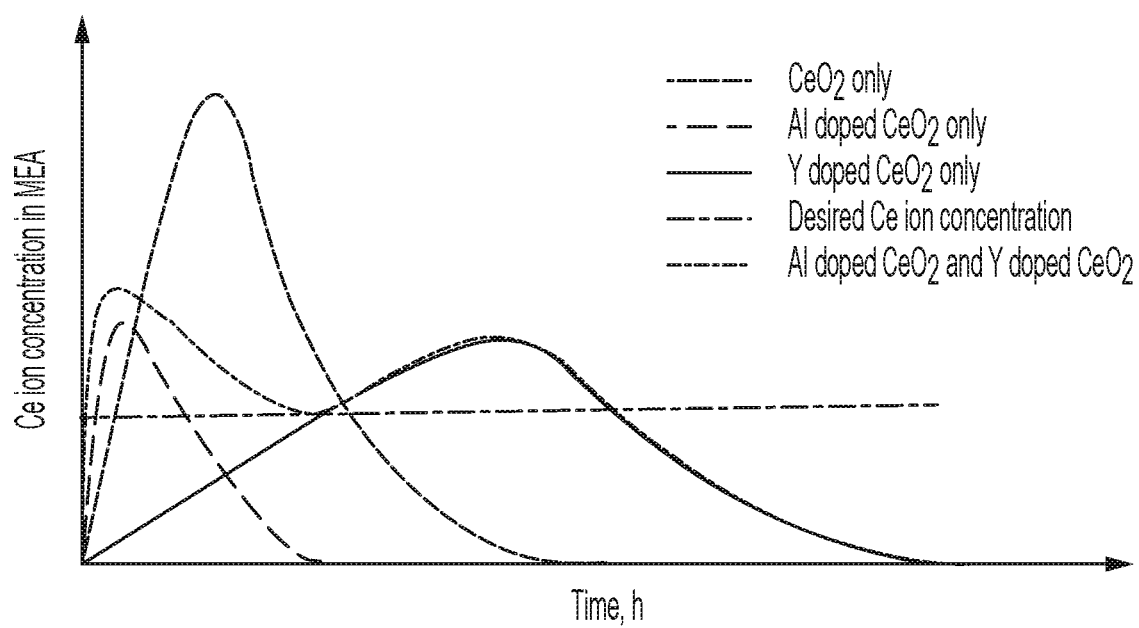
FIG. 1 is a plot of cerium ion concentration in membrane-electrode assembly (MEA) as a function of time.

The present disclosure provides an improvement in the chemical stability of the proton exchange membrane fuel cell (FEMFC) components by providing an antioxidant to quench radicals that damage the proton exchange membrane and negatively impact the life of the fuel cell. The antioxidants described herein serve to control the release of the radical quencher for an extended lifetime, thereby improving the fuel cell lifespan. In particular, a mixture of faster and slower release cerium oxide compounds than pure cerium oxide with same particle size is used as the antioxidant. In some embodiments the terms "faster" and "slower" can correspond to speed that is 10 times, 100 times or more faster or slower than the comparative speed.

In order to achieve improved lifespan of the PEMFCs beyond the typical operational lifetime of 5,000 hours, antioxidant is used to react with the free radicals generated from catalytic reaction of PEMFCs. Cerium oxide is used as a reservoir of cerium ions that act as an antioxidant. In particular, it is believed that cerium ions mitigate chemical attacks from free radicals to the membrane and other components in the fuel cell. While not wanting to be bound by any particular theory, cerium(III) ions are believed to be oxidized by hydroxyl radicals (HO•) to form tetravalent cerium(IV) ions and water; the former are subsequently regenerated back to cerium(III) through rapid reduction by hydroperoxyl radicals (HOO•) or hydrogen peroxide ($H_2O_2$).

While use of cerium ions ($Ce^{3+}$ and $Ce^{4+}$) in proton exchange membranes can prevent damage to the proton exchange membrane, in the radical quenching reactions, some cerium ions will leach out of the PEMFC with water. The resulting cerium ions in the fuel cell can poison the catalyst and reduce the ion conductivity of the membrane. Either of these events will cause a decrease in fuel cell performance and efficiency. In addition, contaminated membranes are subject to reduced mechanical stability which negatively impacts fuel cell life.

In order to maintain a desired cerium ion concentration in a fuel cell for mitigating free radicals for heavy-duty vehicle applications, a larger amount of antioxidant needs to be added to the fuel cell stack. Without a release strategy, however, a higher cerium ion concentration will be in fuel cell stack which lowers fuel cell performance and durability. This will cause higher initial material costs (bigger stack) and more fuel ($H_2$) costs to customers. The instant disclosure, in some aspects, concerns controlled release technology to control cerium ion concentration in the membrane-electrode assembly (MEA) to allow the operational lifetime needed for heavy-duty vehicle fuel cells, and other vehicle fuel cells.

Controlled release of cerium ions can be achieved by adding at least two antioxidants with faster and slower release speeds. In some embodiments, the antioxidant comprises yttrium doped cerium oxide and a metal doped cerium oxide that has a faster release time of cerium ions compared to yttrium doped cerium oxide. Aluminum-doped cerium oxide is one metal doped antioxidant having a faster release time of cerium ions compared to yttrium doped cerium oxide. Other doped cerium oxides include praseodymium doped $CeO_2$ that has a slower release time than $CeO_2$ as well as zirconium doped $CeO_2$ and gadolinium doped $CeO_2$ which have faster release times than $CeO_2$. The overall loading of cerium ions can be controlled to a predetermined level so that fuel cell performance will not decrease significantly over time.

The phrase "a faster release time of cerium ions compared to yttrium doped cerium oxide" means that the compound releases cerium ions at a faster rate than yttrium doped cerium oxide from the beginning of the release.

Importantly, by using the controlled release concepts described herein, a longer lifespan of the fuel cell can be achieved without sacrificing fuel cell performance significantly.

In some examples, the fuel cell has an operational lifetime of more than 5,000 hours, at least 7,500 hours, at least 8,000 hours, at least 10,000 hours, at least 20,000 hours or at least 25,000 hours.

As seen in FIG. 1, the doping of cerium oxide ($CeO_2$) with yttrium provides improved stability of the $CeO_2$ which is the source of cerium ions. While yttrium doped cerium oxide provides a longer supply of an optimal level of cerium ions to the system, initial levels of cerium ions tend to be lower than desired. When aluminum doped cerium oxide is used in addition to yttrium doped cerium oxide, a predetermined level of cerium ions is provided for a predetermined period of time when compared to undoped cerium oxide or aluminum doped cerium oxide.

The antioxidant can reside in one or more of the proton exchange membrane, anode, cathode, anode diffusion layer, cathode diffusion layer, first microporous layer and second microporous layer. In one example, the antioxidant is placed in the proton exchange membrane. In some embodiments, the total amount of antioxidant is 50 µg/cm² to about 1000 µg/cm² or about 100 µg/cm² to about 750 µg/cm² or 150 µg/cm² to about 500 µg/cm² of antioxidant is utilized. In some embodiments, the amount of metal doped cerium oxide that has a faster release time of cerium ions compared to yttrium doped cerium oxide (such as aluminum doped cerium oxide) is about 1 to about 50 mol % or about 2 to about 40 mol % or 5 to about 30 mol % of the amount of yttrium doped cerium oxide.

In some embodiments, the amount of yttrium in the yttrium doped cerium oxide comprises about 1 to about 50 mol % or about 5 to about 40 mol %, 5 to about 35 mol % of yttrium or about 10 to about 30 mol %.

In certain embodiments, the amount of aluminum in the aluminum doped cerium oxide comprises about 1 to about 50 mol % or about 2 to about 40 mol % or 5 to about 30 mol %.

Metal doped cerium oxides include, but are not limited to yttrium, aluminum, zirconium, praseodymium, and gadolinium doped cerium oxides. These metal doped cerium oxides will typically comprise an amount of metal in the metal doped cerium oxide of about 1 to about 50 mol % or about 2 to about 40 mol % or 5 to about 30 mol %.

In some embodiments, the yttrium doped cerium oxide and metal doped cerium oxide (such as aluminum doped cerium oxide) independently have a particle size of about 10 nm to about 1 µm. Smaller particle size is more unstable but could be more active. Bigger particle sizes are more stable but could be less active. Considering particle application of adding particles to the MEA components (usually micro thickness), if the particles are too big, they may significantly affect the integrity of the components and may be too inactive.

Figure 2:
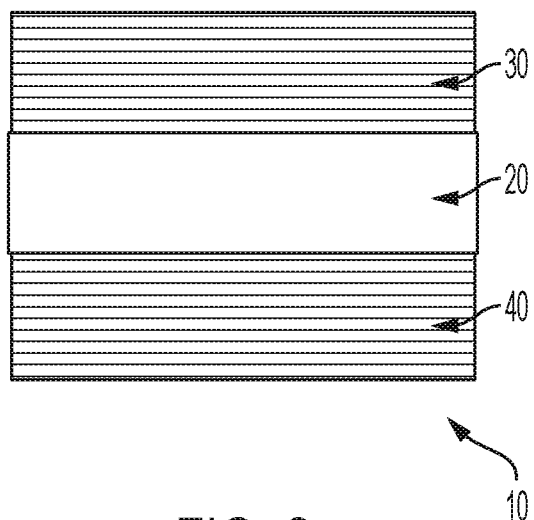
FIG. 2 is a cross-sectional view of one membrane electrode assembly of the present teachings.

FIG. 2 is an illustration of membrane-electrode assembly (MEA) 10 comprising a proton exchange membrane 20, an anode 30, and a cathode 40.

The proton exchange membrane 20 is configured to support proton transfer (i.e., proton conduction) across the membrane, and to be electrically insulative. The proton exchange membrane 20 can be a pure polymer membrane or a composite membrane, and can be formed of any suitable material, such as a perfluorosulfonic acid polymer, other fluoropolymers, hydrocarbon polymers, or any other suitable material. The MEA 10 further includes an anode 30 comprising an anodic catalyst layer, configured to electrolytically catalyze an anodic hydrogen-splitting reaction:

$$H_2 \rightarrow 2e^- + 2H^+.$$

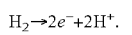

The anodic catalyst layer can be substantially formed of anodic catalyst particles of platinum or a platinum alloy supported on carbon, such as carbon black.

The MEA 10 further includes a cathode 40, configured to catalyze an oxygen reduction reaction:

$$O_2 + 4e^- + 4H^+ \rightarrow 2H_2O.$$

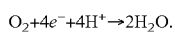

The cathodic catalyst layer can include cathodic catalyst particles of platinum or a platinum alloy supported on carbon, such as carbon black. In some implementations, the cathodic catalyst particles will be a platinum-cobalt alloy. In some such implementations, the weight ratio of platinum to cobalt can be about 3:1 to about 15:1. In certain embodiments the ratio is about 10:1.

In some embodiments, the proton exchange membrane is a perfluorosulfonic acid (PFSA) polymer ion exchange membrane. PFSA polymers are commercially available. Non-limiting examples of PFSA polymers are the lines of products sold under the tradenames Nafion™ (marketed by the Chemours Company) and Aquivion™ (marketed by Solvay). An anode catalyst layer and a cathode catalyst layer are made of a material having gas permeability and electrical conductivity and supporting a catalyst (e.g., platinum or platinum alloy) for accelerating the electrochemical reaction of hydrogen with oxygen and are made of a carbon carrier with the catalyst supported thereon. The anode layer and cathode layers are opposite faces of the proton exchange membrane.

The first catalyst and the second catalyst each are independently a platinum or platinum alloy catalyst. In some embodiments, the platinum or platinum alloy is loaded on a conductive support such as carbon. Suitable carbon conductive supports include, but are not limited to, carbon black, graphite, activated carbon, and carbon nano tubes. Platinum alloys include platinum-cobalt alloys. Examples of such alloys are described in published U.S. Patent Application No. 2009/0092888.

In some implementations, the anodic catalyst layer and/or the cathodic catalyst layer can include a solid ionomer, such as a fluorinated polymer, e.g., perfluorosulfonic acid (PFSA) such NAFION® marketed by the Chemours company. Other commercially available examples include FLEMION® (Asahi Glass Company) ACIPLEX® (Asahi Kasei) and FUMION® (FuMA-Tech).

In some implementations, the anodic and/or cathodic catalyst particles can have an average maximum dimension of 2-5 nm. In some implementations, the anodic and/or cathodic catalyst particles will include porous particles which provide increased surface area for catalyst activity.

Figure 3:
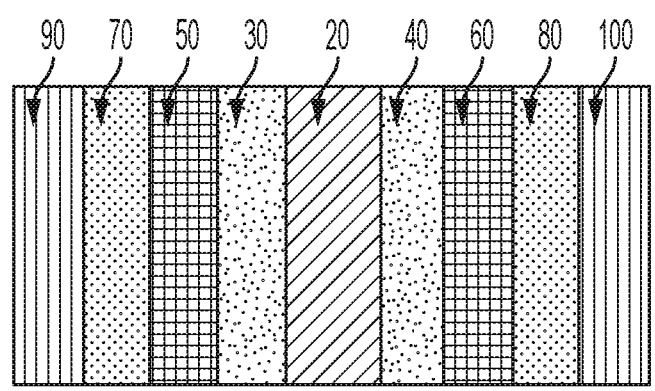
FIG. 3 is a cross-sectional view of a portion of one fuel cell of the present teachings.

FIG. 3 presents one representation of an example of a fuel cell. The fuel cell includes a membrane-electrode assembly (MEA) comprising a proton exchange membrane 20, an anode 30 and a cathode 40. A first microporous layer 50 contacts the anode 30. An anode gas diffusion layer 70 contacts the first microporous layer 50 and a first flow channel 90 contacts the anode gas diffusion layer 70. A second microporous layer 60 contacts the cathode 40. A cathode gas diffusion layer 80 contacts the second microporous layer 60 and a second flow channel 100 contacts the cathode gas diffusion layer 80. Not pictured in FIG. 3, an anode bipolar plate may contact the first flow channel 90 and a cathode bipolar plate may contact the second flow channel 100.

It will be understood that the proton exchange membrane (PEM) places the anodic catalyst layer and the cathodic catalyst layer in protic communication with one another. The construct can include an anode gas diffusion layer 70 and the cathode gas diffusion layers 80, respectively, in contact with the anodic catalyst layer and the cathodic catalyst layer, respectively. The anode and cathode gas diffusion layers, 70 and 80, respectively, are configured to allow hydrogen and oxygen gas to diffuse to the anodic and cathodic catalyst layers, respectively, and to allow water product to diffuse away from the cathodic catalyst layer.

The first microporous layer 50 and the second microporous layer 60 are mainly composed of a water-repellent resin and an electrically conductive material. In some embodiments, carbon, or polytetrafluoroethylene (PTFE) are utilized in the first microporous layer 50 and the second microporous layer 60.

The anode gas diffusion layer 70 and the cathode gas diffusion layer 80, contacting the anode and cathode respectively, are made of a material having gas permeability and electrical conductivity and may be made of a carbon porous material such as carbon paper, carbon cloth, glass-like carbon, or the like. Other examples use a porous metallic body. In some embodiments, the gas permeability, or the degree of permeation of the reactive gas through the anode diffusion layer or through the cathode diffusion layer is substantially uniform over the whole surface of the diffusion layer according to this embodiment. In some embodiments, carbon paper or carbon cloth are utilized.

The first flow channel is provided to let fuel gas flow on the surface of the anode diffusion layer. The second flow channel is provided to allow oxidizing gas flow on the surface of the cathode diffusion layer. In some embodiments, the first and second flow channels are formed from a carbon resin, stainless steel, titanium, a titanium alloy, or an electrically conductive ceramic material.

The fuel gas is typically hydrogen. The hydrogen gas may be stored in a storage tank. Optionally, hydrogen may be stored as metal hydrides or may be hydrogen obtained by reforming a hydrocarbon fuel.

The oxidizing gas is typically an oxygen-containing gas. In some embodiments, the oxidizing gas is ambient air.

Figure 4:
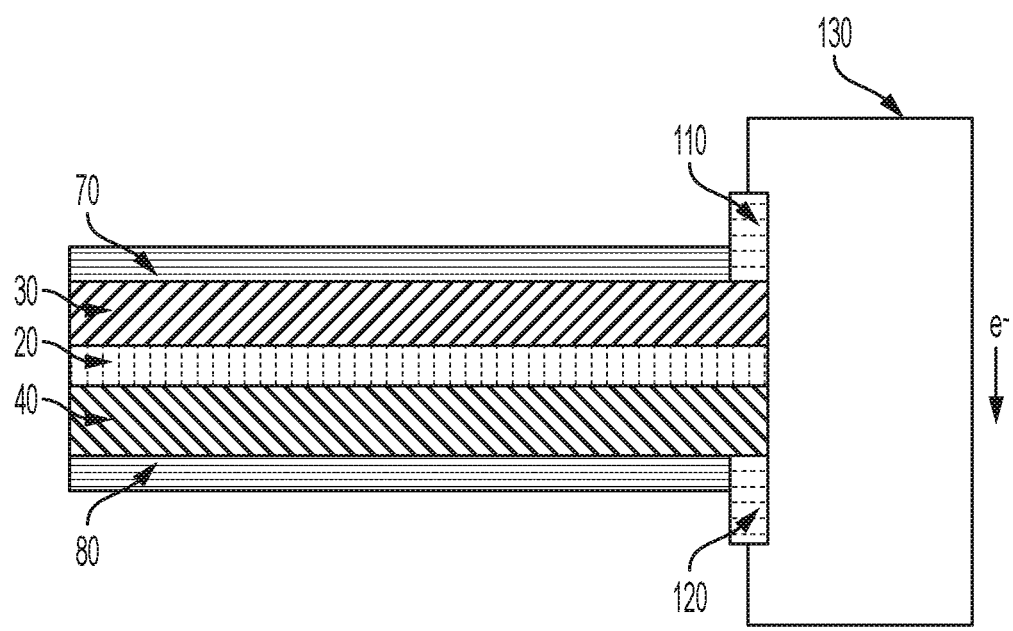
FIG. 4 is a cross-sectional view of a portion of one fuel cell of the present teachings.

As shown in FIG. 4, the fuel cell comprising a proton exchange membrane 20, anode 30, cathode 40, anode gas diffusion layer 70 and cathode gas diffusion layer 80 can further include anodic current collectors 110 and cathodic current collectors 120, configured to be in electric communication with the anodic and cathodic catalyst layers, respectively, and to connect to be connected to an external circuit 130.

Figure 5:
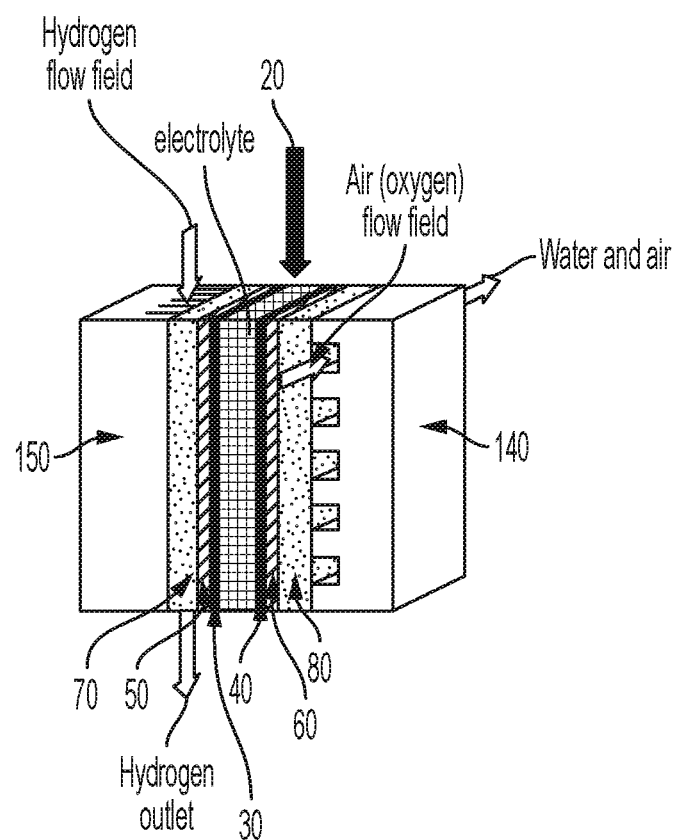
FIG. 5 is a cross-sectional view of a portion of a fuel cell of the present teachings.

FIG. 5 shows an example of a fuel cell having a proton exchange membrane 20, an anode 30 and a cathode 40. A first microporous layer 50 contacts the anode 30. An anode gas diffusion layer 70 contacts the first microporous layer 50. A second microporous layer 60 contacts the cathode 40. A cathode gas diffusion layer 80 contacts the second microporous layer 60. An anode bipolar plate 150 contacts the anode gas diffusion layer 70 and a cathode bipolar plate 140 contacts the cathode gas diffusion layer. Hydrogen and air flow within the cell is pictured in FIG. 5. Hydrogen ($H_2$) is fed to the anode side of the fuel cell and an oxygen source (such as ambient air) is fed to the cathode side of the fuel cell. Water and excess air are depicted as exiting the cathode side of the fuel cell and unreacted hydrogen is shown as exiting the anode side of the fuel cell.

The anode bipolar plate 150 and the cathode bipolar plate 140 can independently be made from a metal (such as titanium or stainless steel), or a carbon structure (such as graphite). Some metal bipolar plates use a carbon film coating on some or all surfaces of the bipolar plate. U.S. Pat. No. 10,283,785 teaches use of an amorphous carbon film in bipolar plates. In the fuel cell, the fuel gas and the oxygen gas should be separately supplied to the entire electrode surfaces without being mixed with each other. Therefore, the bipolar plates should be gas tight. Furthermore, the bipolar plates should collect electrons generated by the reaction and have good electric conductivity in order to serve as electric connectors for connecting adjoining single cells when a plurality of single cells are stacked. Moreover, because electrolyte membrane surfaces are strongly acidic, the bipolar plates provide good corrosion resistance.

The invention also concerns methods of improving chemical stability of a proton exchange membrane fuel cell having a membrane assembly, the method comprising inclusion within the membrane-electrode assembly of an antioxidant comprising yttrium doped cerium oxide and a metal doped cerium oxide that has a faster release time of cerium ions compared to yttrium doped cerium oxide. The membrane-electrode assembly comprises an anode comprising a first catalyst, a cathode comprising a second catalyst, and a proton exchange membrane positioned between the anode and cathode.

The present disclosure is not limited to the fuel cell but may be applicable to various other aspects, such as a vehicle driven by utilizing electric power of the fuel cell, a power generation system that supplies electric power of the fuel cell, and other articles comprising the fuel cells. In some embodiments, the vehicle is a passenger car or truck. The present invention is not limited to the above aspects or examples but may be implemented by any of various other aspects or examples within the scope of the invention.

Trucks include (i) light duty trucks weighing below 10,000 pounds, (ii) medium duty trucks which weighing 10,000-26,000 pounds and (iii) heavy duty trucks weighing over 26,000 pounds.

A passenger car is a motor vehicle designed to carry multiple passengers on highways and streets. In some embodiments, the passenger can carry up to nine occupants.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Example 1. Fabrication of MEA

In one example, a catalyst mixture comprising platinum or platinum alloy supported on carbon particles and antioxidants are sprayed on both sides of a proton exchange membrane to form catalyst coated membrane. Gas diffusion layers were then hot-pressed with catalyst coated membrane to form membrane electrode assembly. Commercial yttrium doped $CeO_2$ nanoparticles, $CeO_2$ nanoparticles and aluminum doped $CeO_2$ nanoparticles were commercially obtained and used.

Example 2. Evaluation of Antioxidants in Fenton Solution

Fenton Solution Test: Yttrium doped $CeO_2$ nanoparticles, $CeO_2$ nanoparticles and aluminum doped $CeO_2$ nanoparticles were reacted with 3 wt % hydrogen peroxide with 8 ppm $FeSO_4$ at 80° C. to simulate the PEMFC environment for one hour. The initial molarity of cerium was controlled at 0.2905 mol for all samples. The solutions were filtered with 0.22 μm and 0.02 μm filters after reaction.

ICP-MS Test: High resolution ICP-MS (Thermo Scientific iCAP ICP-MS) was used to test the concentration of cerium of the solutions after reaction. The concentrations of cerium ions where compared based on the intensity (counts) of the mass weight of Ce.

Figure 6:
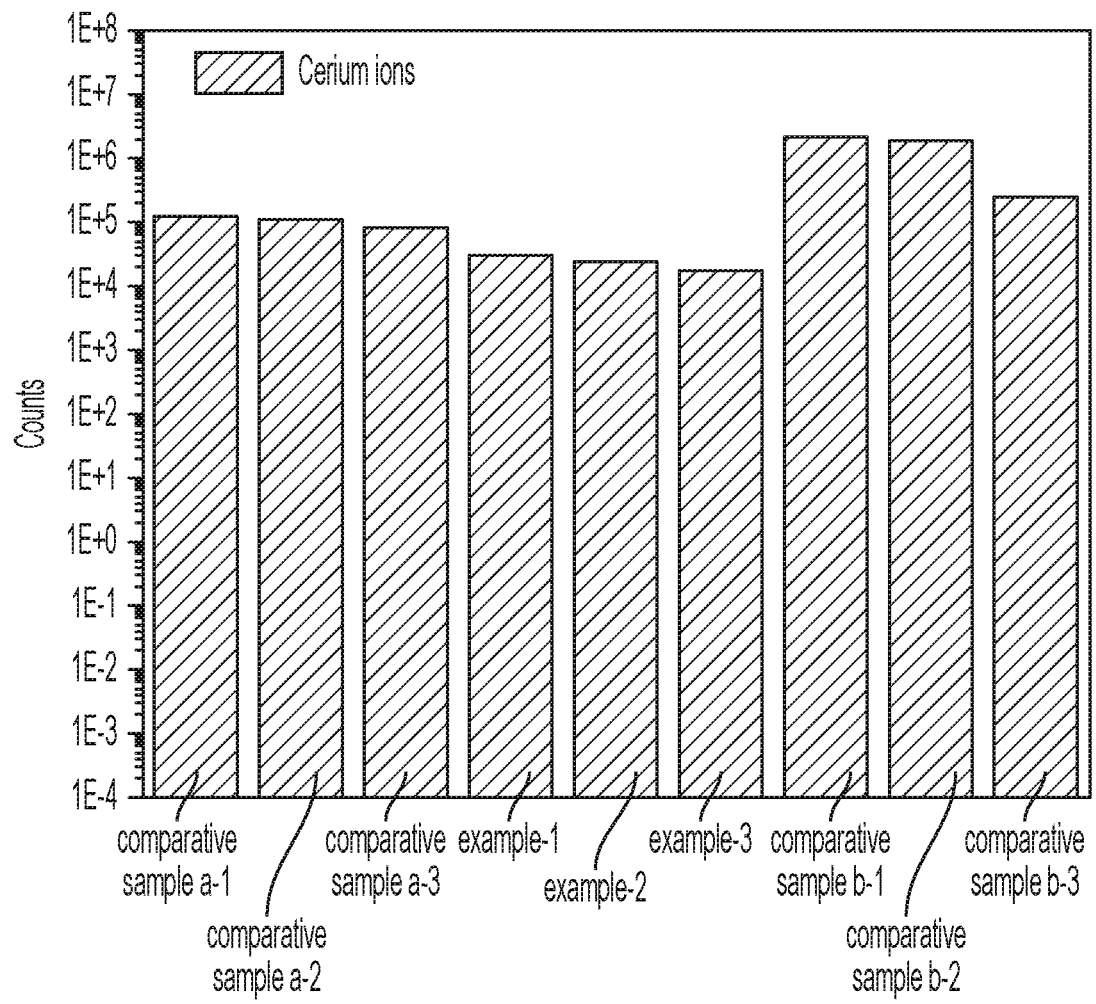
FIG. 6 illustrates the cerium ion concentration comparison of cerium oxide ($CeO_2$), yttrium doped $CeO_2$, and aluminum dopes $CeO_2$.

FIG. 6 shows counts of Ce ions measured by ICP-MS for:
- $CeO_2$ nanoparticles (comparative sample-a, 10 nm (a-1), 50 nm (a-2) and 100 nm (a-3)),
- 10 nm yttrium doped $CeO_2$ nanoparticles (example, 5 mol % (example-1), 15% mol (example-2) and 30 mol % (example-3)) and
- aluminum doped $CeO_2$ nanoparticles (comparative sample b, 20 nm (b-1), 50 nm (b-2), 100 nm (b-3)).

As can be seen from FIG. 6, the Yttrium doped $CeO_2$ nanoparticles improve the stability of cerium from leaching during the radical quenching reaction. Specifically, FIG. 6 shows the cerium ion concentration comparison of $CeO_2$, yttrium doped $CeO_2$, and aluminum doped $CeO_2$ with similar sizes. Lower counts from ICP-MS means lower concentration of cerium ions in the solution after reaction. Yttrium doping lowers the cerium ions compared to $CeO_2$ without doping. At higher yttrium doping, the $CeO_2$ is more stable. On the contrary, aluminum doping accelerates the leaching of cerium ions.

Further, the disclosure comprises additional notes and examples as detailed below.

Clause 1. A membrane-electrode assembly comprising:
an anode comprising a first catalyst;
a cathode comprising a second catalyst; and
a proton exchange membrane between the anode and cathode;
wherein at least one of the proton exchange membrane, anode, and cathode comprise an antioxidant comprising yttrium doped cerium oxide and a metal doped cerium oxide that has a faster release time of cerium ions compared to yttrium doped cerium oxide.

Clause 2. The membrane-electrode assembly of clause 1, wherein the metal doped cerium oxide is aluminum doped cerium oxide.

Clause 3. The membrane-electrode assembly of clause 1 or clause 2, wherein the proton exchange membrane comprises a perfluorosulfonic acid polymer.

Clause 4. The membrane-electrode assembly of any one of clauses 1-3, wherein the amount of yttrium in the yttrium doped cerium oxide comprises about 1 to about 50 mol %.

Clause 5. The membrane-electrode assembly of any one of clauses 2-4, wherein the amount of aluminum in the aluminum doped cerium oxide is about 1 to about 50 mol %.

Clause 6. The membrane-electrode assembly of any one of clauses 1-5, wherein about 50 μg/cm$^2$ to about 1000 μg/cm$^2$ of antioxidant is utilized.

Clause 7. The membrane-electrode assembly of any one of clauses 1-6, wherein the amount of metal doped cerium oxide is about 1 to about 50 mol % of the amount of yttrium doped cerium oxide.

Clause 8. The membrane-electrode assembly of any one of clauses 1-7, wherein the yttrium doped cerium oxide and metal doped cerium oxide independently have a particle size of about 10 nm to about 1 μm.

Clause 9. The membrane-electrode assembly of any one of clauses 1-8, wherein the first catalyst and second catalyst are independently platinum or a platinum alloy.

Clause 10. A fuel cell comprising:
a membrane-electrode assembly comprising a proton exchange membrane, an anode comprising a first catalyst, and a cathode comprising a second catalyst, the proton exchange membrane between the anode and cathode;
a first microporous layer contacting the anode;
a second microporous layer contacting the cathode;
an anode diffusion layer contacting the first microporous layer;
a cathode diffusion layer contacting the second microporous layer;
a first flow channel contacting the anode diffusion layer;
a second flow channel connecting the cathode diffusion layer;
wherein at least one of the proton exchange membrane, anode, cathode, first microporous layer and second microporous layer comprise an antioxidant comprising yttrium doped cerium oxide and a metal doped cerium oxide that has a faster release time of cerium ions compared to yttrium doped cerium oxide.

Clause 11. The fuel cell of clause 10, wherein the metal doped cerium oxide is aluminum doped cerium oxide.

Clause 12. The fuel cell of clause 10 or clause 11, wherein the proton exchange membrane comprises a perfluorosulfonic acid polymer.

Clause 13. The fuel cell of any one of clauses 10-12, wherein the amount of yttrium in the yttrium doped cerium oxide is about 1 to about 50 mol %.

Clause 14. The fuel cell of any one of clauses 11-13, wherein the amount of aluminum in the aluminum doped cerium oxide is about 1 to about 50 mol %.

Clause 15. The fuel cell of any one of clauses 10-14, wherein about 50 µg/cm$^2$ to about 1000 µg/cm$^2$ of antioxidant is utilized.

Clause 16. The fuel cell of any one of clauses 11-15, wherein the amount of aluminum doped cerium oxide is about 1 to about 50 mol % of the amount of yttrium doped cerium oxide.

Clause 17. The fuel cell of any one of clauses 10-16, wherein the first catalyst and second catalyst are independently platinum or a platinum alloy.

Clause 18. The fuel cell of any one of clauses 10-17, wherein the yttrium doped cerium oxide and aluminum doped cerium oxide independently have a particle size of about 10 nm to about 1 µm.

Clause 19. The fuel cell of any one of clauses 10-18, wherein one or both of the anode diffusion layer and the cathode diffusion layer comprise carbon paper.

Clause 20. The fuel cell of any one of clauses 10-19, wherein the antioxidant is placed in the proton exchange membrane.

Clause 21. The fuel cell of any one of clauses 10-20, wherein the proton exchange membrane comprises about 100 ppm to about 100,000 ppm of antioxidant.

Clause 22. A vehicle comprising a fuel cell of clauses 10-21.

Clause 23. The vehicle of clause 22, wherein the vehicle is a passenger car.

Clause 24. The vehicle of clause 22, wherein the vehicle is a truck.

Clause 25. The vehicle of clause 22, wherein the vehicle is a heavy-duty truck.

Clause 26. A method of improving chemical stability of a proton exchange membrane fuel cell having a membrane assembly, the method comprising inclusion within the membrane-electrode assembly of an antioxidant comprising yttrium doped cerium oxide and a metal doped cerium oxide that has a faster release time of cerium ions compared to yttrium doped cerium oxide.

Clause 27. The method of clause 26, wherein the metal doped cerium oxide is aluminum doped cerium oxide.

Clause 28. The method of clause 26 or clause 27, wherein the membrane-electrode assembly comprises an anode comprising a first catalyst, a cathode comprising a second catalyst, and a proton exchange membrane positioned between the anode and the cathode.

Clause 29. The method of any one of clauses 26-28, wherein the proton exchange membrane comprises a perfluorosulfonic acid polymer.

Clause 30. The method of any one of clauses 26-29, wherein the amount of yttrium in the yttrium doped cerium oxide is about 1 to about 50 mol %.

Clause 31. The method of any one of clauses 27-30, wherein the amount of aluminum in the aluminum doped cerium oxide is about 1 to about 50 mol %.

Clause 32. The method of any one of clauses 26-31, wherein about 50 µg/cm$^2$ to about 1000 µg/cm$^2$ of antioxidant is utilized.

Clause 33. The method of any one of clauses 27-32, wherein the amount of aluminum doped cerium oxide is about 1 to about 50 mol % of the amount of yttrium doped cerium oxide.

Clause 34. The method of any one of clauses 27-33, wherein the yttrium doped cerium oxide and aluminum doped cerium oxide independently have a particle size of about 10 nm to about 1 µm.

Clause 35. The method of any one of clauses 26-34, wherein the first catalyst and second catalyst are independently platinum or a platinum alloy.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed:

1. A membrane-electrode assembly comprising:
an anode comprising a first catalyst;
a cathode comprising a second catalyst; and
a proton exchange membrane between the anode and cathode;
wherein at least one of the proton exchange membrane, anode, and cathode comprise an antioxidant comprising yttrium doped cerium oxide and a metal doped cerium oxide that has a faster release time of cerium ions compared to yttrium doped cerium oxide.

2. The membrane-electrode assembly of claim 1, wherein the metal doped cerium oxide is aluminum doped cerium oxide.

3. The membrane-electrode assembly of claim 1, wherein the proton exchange membrane comprises a perfluorosulfonic acid polymer.

4. The membrane-electrode assembly of claim 1, wherein an amount of yttrium in the yttrium doped cerium oxide is about 1 to about 50 mol %.

5. The membrane-electrode assembly of claim 2, wherein an amount of aluminum in the aluminum doped cerium oxide is about 1 to about 50 mol %.

6. The membrane-electrode assembly of claim 1, wherein about 50 µg/cm² to about 1000 µg/cm² of antioxidant is utilized.

7. The membrane-electrode assembly of claim 2, wherein an amount of aluminum doped cerium oxide is about 1 to about 50 mol % of yttrium doped cerium oxide.

8. The membrane-electrode assembly of claim 1, wherein the first catalyst and second catalyst are independently platinum or a platinum alloy.

9. A fuel cell comprising:
a membrane-electrode assembly comprising a proton exchange membrane, an anode comprising a first catalyst, and a cathode comprising a second catalyst, the proton exchange membrane positioned between the anode and cathode;
a first microporous layer contacting the anode;
a second microporous layer contacting the cathode;
an anode diffusion layer contacting the first microporous layer;
a cathode diffusion layer contacting the second microporous layer;
a first flow channel contacting the anode diffusion layer; and
a second flow channel connecting the cathode diffusion layer;
wherein at least one of the proton exchange membrane, anode, cathode, first microporous layer and the second microporous layer comprise an antioxidant comprising yttrium doped cerium oxide and a metal doped cerium oxide that has a faster release time of cerium ions compared to yttrium doped cerium oxide.

10. The fuel cell of claim 9, wherein the metal doped cerium oxide is aluminum doped cerium oxide.

11. The fuel cell of claim 9, wherein the proton exchange membrane comprises a perfluorosulfonic acid polymer.

12. The fuel cell of claim 9, wherein an amount of yttrium in the yttrium doped cerium oxide is about 1 to about 50 mol %.

13. The fuel cell of claim 10, wherein an amount of aluminum in the aluminum doped cerium oxide is about 1 to about 50 mol %.

14. The fuel cell of claim 9, wherein about 50 µg/cm² to about 1000 µg/cm² of antioxidant is utilized.

15. The fuel cell of claim 12, wherein an amount of aluminum doped cerium oxide is about 1 to about 50 mol % of the amount of yttrium doped cerium oxide.

16. The fuel cell of claim 9, wherein the first catalyst and second catalyst are independently platinum or a platinum alloy.

17. The fuel cell of claim 9, wherein one or both of the anode diffusion layer and the cathode diffusion layer comprise carbon paper.

18. The fuel cell of claim 9, wherein the proton exchange membrane comprises the antioxidant.

19. The fuel cell of claim 9, wherein the proton exchange membrane comprises about 100 ppm to about 100,000 ppm of antioxidant.

20. A vehicle comprising a fuel cell of claim 9.

* * * * *